Figure 1:
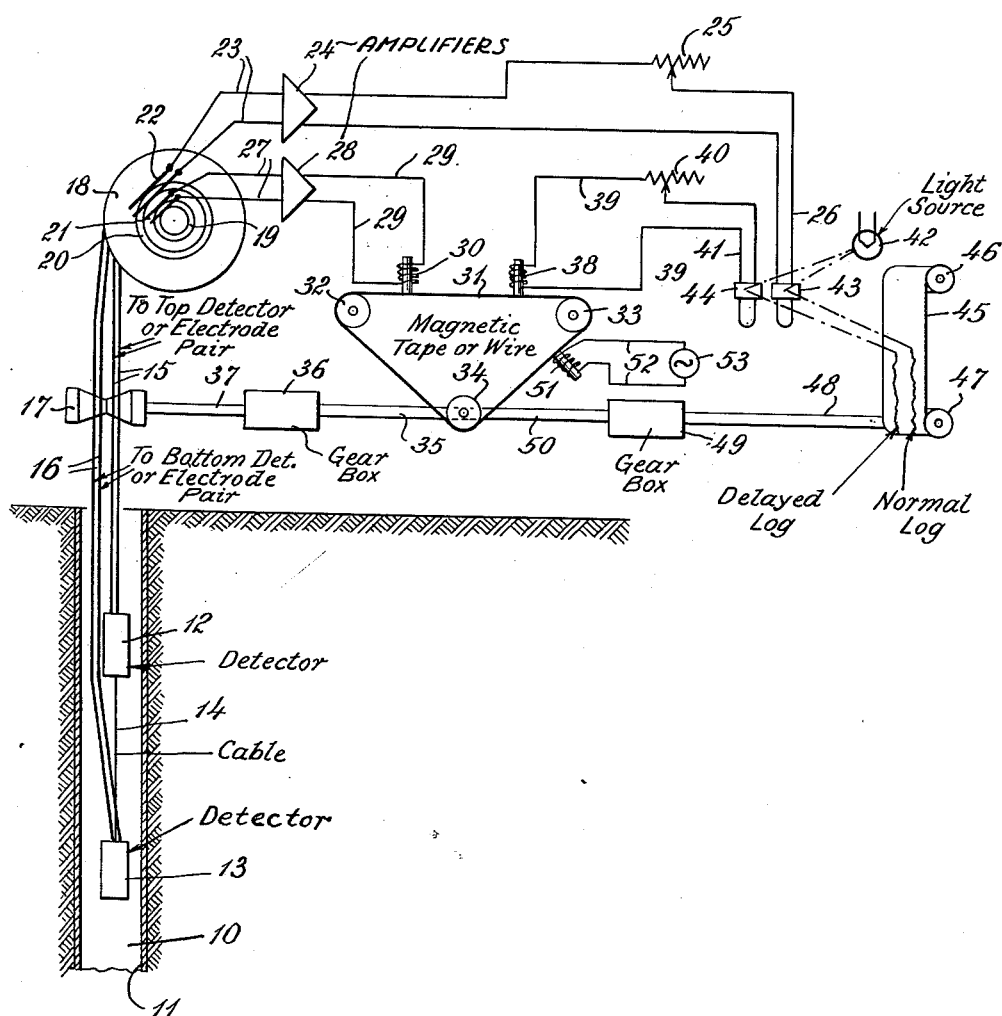

Feb. 24, 1948.  J. Y. CLEVELAND  2,436,503
DELAYED WELL LOGGING
Filed Dec. 22, 1944  2 Sheets-Sheet 1

INVENTOR
JAMES Y. CLEVELAND
BY
ATTORNEY

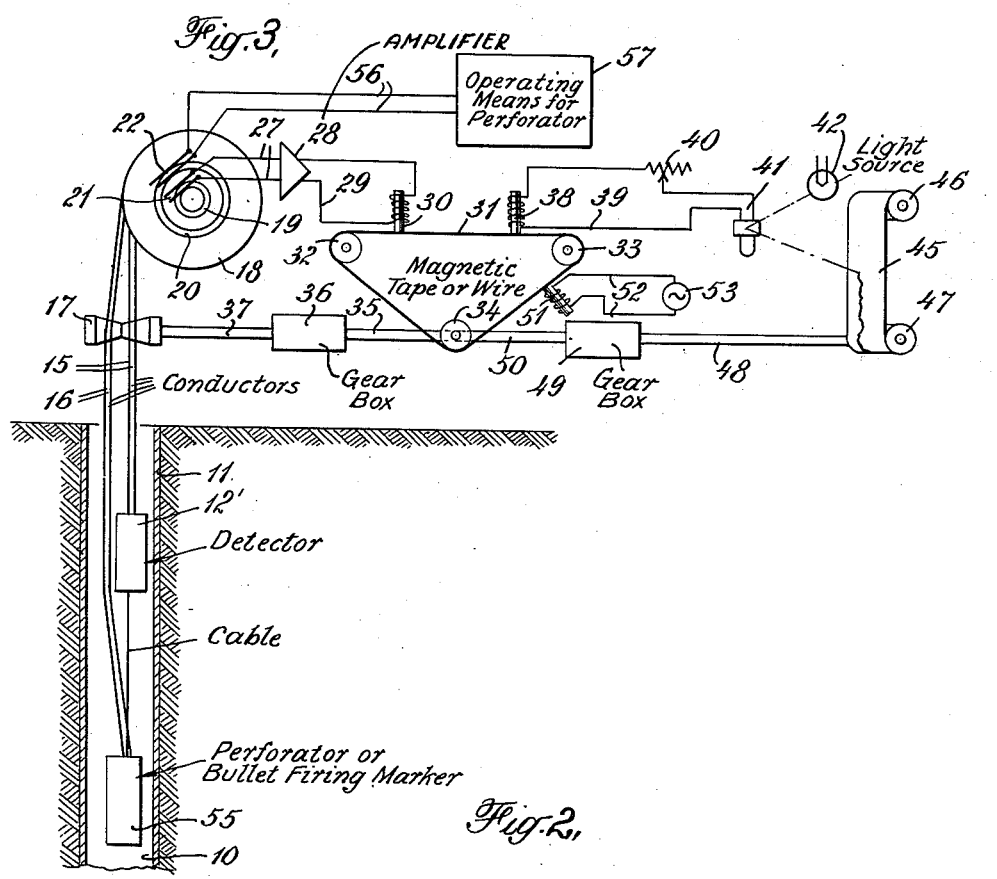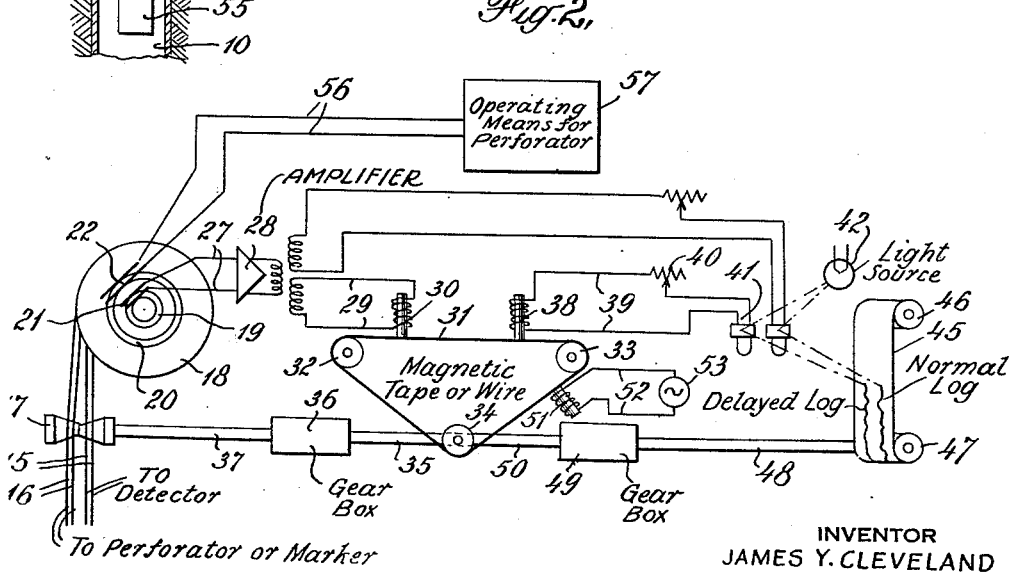

Patented Feb. 24, 1948

2,436,503

UNITED STATES PATENT OFFICE 2,436,503

DELAYED WELL LOGGING

James Y. Cleveland, Scarsdale, N. Y., assignor to Socony-Vacuum Oil Company, Incorporated, New York, N. Y., a corporation of New York Application December 22, 1944, Serial No. 569,345

10 Claims. (Cl. 164—0.5)

This invention relates to the art of geophysical prospecting and more particularly to a method and apparatus adapted for use in surveying and bringing into production oil wells which have been cased and in which the casing has sealed off, intentionally or accidentally, oil bearing strata.

In modern methods of surveying oil wells it has become a common practice to simultaneously record a plurality of logs, for example in radio-activity methods, gamma ray and neutron logs, and in electrical methods, porosity and permeability logs. Where a plurality of logs are made simultaneously, the detecting means or electrodes, depending upon which type of logs are being made, radioactivity or electrical, are necessarily vertically spaced from each other due to the dimensions of the drill hole, which means that characteristics of a particular stratum appearing on each log will be displaced by an amount corresponding to the vertical spacing of the detectors or electrodes. This makes interpretation and comparison of the logs very difficult since the logs, although recorded on separate traces side by side on the same recorder strip, will have a different depth origin.

One form of the instant invention is directed to a method and apparatus for overcoming the above difficulties by the provision of means for simultaneously recording a plurality of logs on the same recorder strip so that they will have the same depth origin whereby the characteristics of a particular stratum appearing on each log will lie directly opposite each other on their separate traces. This is accomplished by delaying the recording of signals from one detecting device until corresponding signals have been detected by the next detecting device at which time corresponding signals from each detecting device are recorded simultaneously. This delay is effected by interposing in the recording circuit of the first detecting device a driven tape on which the signals are recorded magnetically. Then at a point, spaced from the point where the signals are magnetically recorded on the tape a distance required for the tape to move while the second detector is moving into the position where the first detected signals originated, the signals are taken from the tape by a magnetic pick-up device and recorded on a recorder strip that is driven in coordination with the depth of the detecting means. The signals from the second detecting means are not delayed but pass directly to the recording strip and are recorded on a separate trace adjacent that of the signals first detected. In this way characteristics of a particular stratum, when recorded on the traces of the recorder strip, lie directly opposite each other whereby the interpretation and comparison of the two traces or logs are made simple.

Another application of the instant invention is to logging cased or uncased drill holes and simultaneously marking, by means of radioactive bullets, strata encountered which are of interest. The patent to Ennis, No. 2,228,623, approaches this idea in that he teaches placing in the wall or casing of the drill hole a radioactive marker that can be used subsequently as a reference point from which to locate strata that have been selected from a previously made log. In practicing Ennis' invention it is necessary to place a marker a distance from the interesting strata that is equal to the vertical spacing of the marker bullet firing means, from the detecting instrument, or to move the bullet firing means up or down in the drill hole a distance corresponding to the spacing of the marker bullet firing means from the detecting means in order to mark the strata. The present invention is an improvement over that taught by Ennis in that it provides a method and apparatus for accurately marking strata of interest in a bore hole. Where thin producing beds are encountered accurate marking is of extreme importance. This is accomplished by placing in the recording circuit of the detector a delay mechanism whereby the signals detected from a particular stratum will not be recorded until that instant when the marker bullet firing means is at the exact point where the signals were detected. The delay mechanism is the same as that described above.

Another feature of the instant invention resides in dividing the recording circuit so that a portion of the signal energy from the detecting means will be recorded in the form of a log as it is generated, while the remainder of the signal energy is diverted through the delay device and recorded in the form of a separate log on the same recorder strip when the marker bullet firing gun is opposite the point where the signal energy was generated. In this application of the instant invention the observer has an opportunity to study the first log corresponding to those signals that travel directly from the signal detecting means to the recording means, and when he sees signals on the second log, corresponding to those that appear to be of interest on the first log, being repeated on the second log after delay, he can accurately place the marker bullets in the strata of interest without shifting the marker bullet firing gun.

The present invention also has application in simultaneously locating marker bullets that have been previously placed in the casing or the strata of the drill hole and perforating at that exact location. In this form of the invention the perforator is attached to the detecting instrument in such a manner that it is vertically spaced a predetermined distance therefrom. The delay circuit is interposed in the recording circuit to delay the recording of the detected signals until the gun perforator is exactly opposite the point where it is desired to perforate. In this application of the invention it is also possible to divide the signals and record them as two traces on the same recorder strip, one trace representing signals that have travelled directly from the detecting means to the recorder and the other representing signals that have been delayed and recorded at the instant that the perforator is adjacent the point where they were detected. This provides the observer with a trace that can be used as a guide in following the delayed signals to accurately position the perforator adjacent the point where it is desired to perforate.

It is obvious from the above that the present invention also has application to perforating while recording, that is, perforating as the first survey of the drill hole is made. Here again the delay circuit serves to delay the recording of the signals detected until the perforator is directly opposite the strata of interest. In this application of the present invention it is also possible to record a portion of the signal energy directly to make a log that leads one that is made by delaying the remainder of the signal energy until the perforator is adjacent the strata of interest.

Therefore, the primary object of this invention resides in the provision of a method and apparatus whereby detected signals can be delayed a predetermined period of time before they are recorded on a recorder strip in coordination with the depth in the form of a well log.

Another object of this invention resides in the provision of a method and apparatus for simultaneously surveying and accurately marking strata found to be of interest by delaying the recording of the surveying data until the marking device is exactly at the point where the surveying data was detected.

Still another object of the present invention resides in the provision of a method and apparatus for simultaneously surveying a drill hole and accurately perforating adjacent strata found to be of interest by delaying the recording of the detected signals until the perforator is opposite the point where the signals were detected.

This invention further contemplates a method and apparatus for recording signals from vertically spaced detectors in the form of separate traces on a recorder strip in correlation with depth in such a manner that they will have, when recorded, the same depth origin.

Still another object of the present invention resides in the provision of a method and apparatus for detecting markers that have been previously placed in the casing or strata of the drill hole and recording signals indicating the presence of the markers adjacent the detecting instrument when the perforator attached to the detecting instrument is at the exact point where the identifying signals were detected.

This invention further contemplates a method and apparatus for recording well logs and/or locating markers in which the detected signal energy is divided and a portion of it is recorded directly while the remainder is delayed a predetermined period of time and then recorded on the same recorder strip in the form of a separate trace.

Other objects and advantages of the present invention will become apparent from the following detailed description when considered with the drawings, in which:

Figure 1 is a diagrammatic illustration of the present invention as applied to a well surveying operation in which a plurality of logs are recorded on a single recorder strip showing the manner in which the delay mechanism operates to produce adjacent logs having the same depth origin.

Figure 2 is a diagrammatic illustration of the use of the present invention to delay the recording of detected signals until perforating means or marker bullet firing means have moved into the position where the signals were detected, and Figure 3 is a diagrammatic illustration of a well surveying operation in which a normal log and a delayed log from the same detector are simultaneously recorded on a single recorder strip.

Referring to the drawings in detail, particularly Figure 1, a drill hole 10 is shown having a casing 11 therein. Although the casing 11 is shown it is not essential to the practicing of all phases of the present invention. Disposed within the drill hole and vertically spaced from each other are detecting means 12 and 13. Detecting means 12 and 13 are secured together by means of a cable or other connecting means 14. These detecting means may be electrometers of the type used in radioactivity well surveying, or electrodes of the type used in electrical well surveying. They will hereafter be referred to as detectors. The detectors 12 and 13 are connected to conductors 15 and 16, respectively. These conductors, although shown separated, may be carried by an insulated cable which extends from within the hole 10 to the surface where it passes over a measuring wheel 17 to a drum 18, on which it is wound. Electrical connection is made with the conductors 15 and 16, on the drum 18, by means of slip rings 19 and 20 on which two pairs of brushes 21 and 22 are adapted to bear. Brushes 22 are connected by conductors 23 to an amplifier 24 which includes any other necessary conventional surface equipment. The output of this amplifier 24 is connected through a variable resistance 25 to one element 26 of a recording galvanometer. Brushes 21 are connected by conductors 27 to an amplifier 28 that is similar to amplifier 24. The output of amplifier 28 is connected by means of conductors 29 to a magnetic recording stylus 30 which operates to impress signals magnetically on a moving tape or wire 31. Tape 31, as shown, passes over horizontally spaced rollers 32 and 33 and down around a third roller 34. Roller 34 is geared to the shaft 35 which is driven through a gear box 36 and the shaft 37 by the measuring wheel 17. At a point above the tape, but horizontally spaced from the stylus 30 in the direction of movement of the tape, is located a magnetic pick-up unit 38 which is adapted to pick up the signals from the tape and conduct them in the form of electrical currents through the conductors 39 and the variable resistance 40 to an element 41 of the multiple element galvanometer. The galvanometer here shown for illustrating the present invention comprises a light source 42, vibrating elements 26 and 41 which carry mirrors 43 and 44, respectively, from which light is reflected from the source 42 onto a moving photographic film or sensitized paper 45. The moving photographic film or sensitized paper 45 is fed from a supply roll 46 to a take-up roll 47. Take-up roll 47 is driven through the shaft 48, gear box 49 and shaft 50 by the same means which drives pulley 34. The speed of the take-up roll can be adjusted to any desired speed by means of the gear box 49.

The speed at which the tape is driven can be adjusted to any desired speed by means of the gear box 36. It is to be understood that when the gears in gear box 36 are changed that those in gear box 49 will also have to be changed to readjust the speed of the take-up roll 47. In order that an endless tape can be used for magnetically recording the signals from the amplifier 28, the tape is caused to pass through an A. C. field that is supplied by the solenoid 51 which is connected by means of conductors 52 to a source of A. C. 53. This A. C. solenoid 51 produces an alternating field through which the tape passes to remove the signals magnetically impressed on it by the magnetic stylus 30. The tape is then ready to receive new signals. The invention as described thus far will produce a normal log from the galvanometer element 43 on the recorder strip 45 while galvanometer element 44 will simultaneously produce a log that is delayed in time an amount equal to the period of time required for the tape 31 to move a distance equal to that between the recording stylus 30 and the pick-up unit 38. This period of delay can be adjusted by changing the spacing between the stylus and the pick-up unit, or by varying the speed at which the magnetic tape is driven relative to the speed of the measuring wheel 17. When proper adjustment of these elements has been made, the normal log and the delayed log that are recorded in the form of adjacent traces on the recorder strip 45 will have the same depth origin, and the characteristics of a particular stratum when recorded on each trace will lie directly opposite each other. This feature is very important in well logging since it makes it possible to directly compare corresponding characteristics on the separate traces and thereby facilitates the interpretation of the logs. The period of time that the one log is delayed will exactly correspond to that period of time required for the trailing detector to move to the position occupied by the leading detector when the signals detected by the leading detector was at that position.

Another application of the present invention is to simultaneously surveying a drill hole and marking strata that appear to be of interest for purposes of future perforation. In this application of this invention an operation such as that illustrated in Figure 2 would be used. In this figure signals generated by the detector 12' are in the same manner, as described in connection with Figure 1, conducted through conductors 15 which may be embodied in an insulated cable which leads to the drum 18. The cable carrying conductors 15 is of such length to extend to the bottom of the drill hole. Connection is made to the ends of conductors 15, which are wound on the drum 18, by means of the slip rings 19 and brushes 21. Conductors 27 extend from the brushes 21 to an amplifier 28. The output of the amplifier is connected through conductors 29 to the stylus 30 which magnetically records the signals on the moving tape 31. A pick-up unit 38 is horizontally spaced in the direction of the travel of the tape 31 from the stylus 30, a distance through which the tape 31 travelled while a marker bullet firing device 55 moved a distance equal to its vertical spacing from the detector 12'. The signals picked up by the pick-up unit 38 are then conducted to the vibrating element 41 of a galvanometer by means of the conductors 39. The galvanometer consists of a light source 42, a vibrating element 41, a mirror carried by the vibrating element 41 and a recorder strip 45. The recorder strip 45 is supplied from a feed roll 46 to a take-up roll 47 that is driven in the manner explained in connection with Figure 1 in coordination with the depth at which the signals were detected or the depth at which the marker bullet firing means is located. The marker bullet firing means is electrically connected through conductors 16 which may be also carried by the cable that carried the conductors 15 to slip rings 20 carried by the drum 18. Brushes 22 adapted to bear on the slip rings 20 are connected by means of conductors 56 to the marker bullet firing means 57. Since the marker bullet firing means 57 are conventional, and well known in the art, a detailed description will not be given here.

A modification of this form of the invention is shown in Figure 3. In this embodiment of the invention marker bullets are also placed in strata of interest as a well log is made. This form of invention, however, differs from that described in the preceding paragraphs in that the signals from the detector are conducted to the amplifier 28 then the output signals from the amplifier 28 are divided. A portion of the signals are conducted directly to the vibrating element of a multiple element of the galvanometer where they are recorded on the recorder strip in coordination with the depth to give a log such as that obtainable by the method and apparatus of the prior art. The remaining portion of the signals from the amplifier 28, however, are conducted through a delay mechanism, such as that described above, to a second vibrating element of the multiple element galvanometer from which they are recorded on the recorder strip in the form of a separate trace adjacent the normal log. The two logs that are recorded on the same recording strip represent a normal log and a log that has been delayed an amount of time equal to the time required for the marker bullet firing means to travel a distance equal to the distance that the marker bullet firing means is vertically spaced from the signal detector. In this embodiment of the invention the operator of the apparatus is given an opportunity to view the log being recorded, that is the normal log, before the marker bullet firing means arrives at the point where the signals on the normal log were detected. With this advantage the operator has the opportunity of viewing the normal log and selecting the point of interest so he can watch the delayed log, and when the characteristics of the strata of interest start to be duplicated on the delayed log, the marker bullet firing means can be actuated to accurately mark the strata of interest so that they can be identified at some later date.

A further application of the present invention is to locating markers which have been placed in the casing adjacent strata of interest and accurately perforating the strata. To accomplish this it is only necessary to replace the marker bullet firing means illustrated in Figures 2 and 3 by a gun perforator of the type well known in the art. Identical or other appropriate firing means such as that illustrated at 57 can be used to actuate the gun perforator. This is an extremely important advantage of the present invention, for in some areas the producing sands are relatively thin and frequently, in utilizing the prior art methods, these sands have been missed entirely when the casing was perforated. By improving the delay circuit of the present invention, the gun perforator can be brought to a point adjacent the marker with absolute accuracy.

Although for purpose of illustrating the present invention a moving steel tape on which signals are recorded magnetically has been shown and described, it is obvious to those skilled in the art that other well known means can be used for recording these signals and reproducing them a controlled period of time later. The operations described above and illustrated in the drawings are extremely flexible, and are such that the elements can be moved at any desired speed in the drill hole without impairing the accuracy of the results obtained.

I claim:

1. A method of positioning a perforator in a previously logged well that comprises the steps of simultaneously traversing the well with a well logging detector and a perforator which are maintained in vertically spaced relationship so that the detector will lead the perforator, said well logging detector producing electrical signals characteristic of the strata penetrated by the well as it traverses the well, transmitting the signals to the surface of the earth, delaying the signals a predetermined period of time, said period of time being that required for the perforator to reach the stratum where the signals were produced, and recording the signals in coordination with the depth at which they were produced.

2. A method of simultaneously logging a well and positioning a perforator for perforating the well that comprises the steps of simultaneously traversing the well with a well logging detector that produces electrical signals characteristic of the strata traversed and a well perforator that are vertically spaced from each other so that the detector leads the perforator; transmitting the signals produced by the detector to the surface of the earth, delaying the signals for a predetermined period of time, the end of said period of time corresponding to the instant that the perforator is adjacent the stratum where the delayed signals were produced, and recording the signals in coordination with the depth at which they were produced, whereby the perforator will be adjacent a stratum when the signals characteristic of that stratum are being recorded.

3. A method of simultaneously logging a well and positioning a perforator for perforating the well that comprises the steps of simultaneously traversing the well with a well logging detector, that produces electrical signals characteristic of the strata traversed by the well and a well perforator that are maintained vertically spaced from each other so that the detector leads the perforator; transmitting the signals produced by the detector to the surface of the earth; dividing the transmitted signals; recording one portion of the divided signals; delaying the other portion of the divided signals for a predetermined period of time, said period of time corresponding to the period required for the following perforator to reach the point at which the signals were produced; and recording the delayed signals on the same recorder strip as the signals that were recorded directly in coordination with the depth at which they were produced.

4. An apparatus for positioning a perforator in a previously logged well that comprises in combination a perforator, a detector adapted to produce electrical signals characteristic of the strata penetrated by a well, means for raising and lowering said detector and perforator in the well, means interposed between the detector and perforator for maintaining a predetermined vertical spacing between the detector and perforator, said detector and perforator being relatively positioned such that in operation the detector will lead the perforator, means for transmitting the signals produced by the detector to the surface of the earth, means for delaying the signals for a period of time equal to that required for the perforator to travel to the point where the signals were produced, and means for recording the signals in correlation with the depth at which they were produced and at the instant that the perforator is at the point where they were produced.

5. An apparatus for positioning a perforator in a previously logged well that comprises in combination a perforator, a detector adapted to produce electrical signals characteristic of the strata penetrated by a well, means for raising and lowering said detector and perforator in the well, means interposed between the detector and perforator for maintaining a predetermined vertical spacing between the detector and perforator, said detector and perforator being relatively positioned such that in operation the detector will lead the perforator, means for transmitting the signals produced by the detector to the surface of the earth, means for delaying the signals for a period of time equal to that required for the perforator to travel to the point where the signals were produced, said delay means comprising means for magnetically recording said signals, and means for reproducing said signals after the elapse of said period of time, and means for recording the signals in correlation with the depth at which they were produced and at the instant that the perforator is at the point where they were produced.

6. An apparatus for positioning a perforator in a previously logged well that comprises in combination a perforator, a detector adapted to produce electrical signals characteristic of the strata penetrated by a well, means for raising and lowering said detector and perforator in the well, means interposed between the detector and perforator for maintaining a predetermined vertical spacing between the detector and perforator, said detector and perforator being relatively positioned such that in operation the detector will lead the perforator, means for transmitting the signals produced by the detector to the surface of the earth, means synchronized with said raising and lowering means for delaying the signals for a period of time equal to that required for the perforator to travel to the point where the signals were produced, and means for recording the signals in correlation with the depth at which they were produced and at the instant that the perforator is at the point where they were produced.

7. An apparatus for simultaneously logging a well and for positioning a perforator for perforating the well that comprises in combination a perforator, a detector adapted to produce electrical signals characteristic of the strata penetrated by the well, means for connecting said detector and perforator in vertically spaced relationship, means for traversing the well with said detector and perforator, means for transmitting the signals produced by the detector which are characteristic of the strata penetrated by the well to the surface of the earth, means for dividing the transmitted signals, means for recording one portion of the divided signal, means for delaying the second portion of the divided signal for a predetermined period of time that is equal to the period of time required for the detector to traverse the well to the point where the signals were produced, and means for separately recording the delayed signals in coordination with the depth to which they were produced.

8. An apparatus for simultaneously logging a well and for positioning a perforator for perforating the well that comprises in combination a perforator, a detector adapted to produce electrical signals characteristic of the strata penetrated by the well, means for connecting said detector and perforator in vertically spaced relationship, means for traversing the well with said detector and perforator, means for transmitting the signals produced by the detector which are characteristic of the strata penetrated by the well to the surface of the earth, means for dividing the transmitted signals, means for recording one portion of the divided signal, means for delaying the second portion of the divided signal for a predetermined period of time that is equal to the period of time required for the detector to traverse the well to the point where the signals were produced, said delay means comprising means for magnetically recording the second portion of the divided signal and means for reproducing the magnetically recorded signals at the end of said delay period of time, and means for separately recording the delayed signals in coordination with the depth to which they were produced.

9. An apparatus for simultaneously logging a well and for positioning a perforator for perforating the well that comprises in combination a perforator, a detector adapted to produce electrical signals characteristic of the strata penetrated by the well, means for connecting said detector and perforator in vertically spaced relationship, means for traversing the well with said detector and perforator, means for transmitting the signals produced by the detector which are characteristic of the strata penetrated by the well to the surface of the earth, means for dividing the transmitted signals, means for recording one portion of the divided signal, means synchronized with said traversing means for delaying the second portion of the divided signal for a predetermined period of time that is equal to the period of time required for the detector to traverse the well to the point where the signals were produced, and means for separately recording the delayed signals in coordination with the depth to which they were produced.

10. An apparatus for simultaneously and separately recording on a single recorder strip two well logs that represent physical characteristics of the strata penetrated by a well comprising in combination at least two detectors, each adapted to produce electrical signals characteristic of the strata, means for connecting said detectors together in vertically spaced relationship, means for raising and lowering said detectors in the well, means for transmitting the signals produced by the detectors in traversing the well to the surface of the earth, means for storing the signals produced by the lead detector until corresponding signals have been produced by the trailing detector, means for recording the signals on the storing means, means for reproducing the recorded signals therefrom after a time interval equal to the time interval between the moments when the respective detectors pass a given stratum, and means driven simultaneously and in synchronism with the raising and lowering means for simultaneously recording the direct signal from one detector and the reproduced stored signal from the other detector.

JAMES Y. CLEVELAND.

REFERENCES CITED

The following references are of record in the file of this patent:

UNITED STATES PATENTS

| Number | Name | Date |
| --- | --- | --- |
| 2,142,555 | Bowsky | Jan. 3, 1939 |
| 2,167,630 | Bazzoni et al. | Aug. 1, 1939 |
| 2,170,857 | Elliott | Aug. 29, 1939 |
| 2,220,070 | Aiken | Nov. 5, 1940 |
| 2,352,433 | Herzog | June 27, 1944 |
| 2,228,623 | Ennis | Jan. 14, 1941 |
| 2,332,873 | Silverman | Oct. 26, 1943 |
| 2,265,768 | Athy et al. | Dec. 9, 1941 |
| 2,338,991 | Arnold | Jan. 11, 1944 |